US008295634B2

(12) United States Patent
Lee et al.

(10) Patent No.: US 8,295,634 B2
(45) Date of Patent: Oct. 23, 2012

(54) METHOD AND APPARATUS FOR ILLUMINATION COMPENSATION AND METHOD AND APPARATUS FOR ENCODING AND DECODING IMAGE BASED ON ILLUMINATION COMPENSATION

(75) Inventors: Yun-gu Lee, Yongin-si (KR); Byung-cheol Song, Suwon-si (KR); Nak-hoon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1174 days.

(21) Appl. No.: 12/107,855

(22) Filed: Apr. 23, 2008

(65) Prior Publication Data

US 2008/0304760 A1 Dec. 11, 2008

(30) Foreign Application Priority Data

Jun. 11, 2007 (KR) .................. 10-2007-0056760

(51) Int. Cl.
*G06K 9/40* (2006.01)
(52) U.S. Cl. ........................ 382/274; 382/238
(58) Field of Classification Search .................. 382/274
See application file for complete search history.

(56) References Cited

U.S. PATENT DOCUMENTS

| 6,055,012 | A  | * | 4/2000  | Haskell et al. ................ 348/48 |
| 7,593,590 | B2 | * | 9/2009  | Shimizu ...................... 382/274 |
| 7,817,865 | B2 |   | 10/2010 | Yang |
| 7,924,923 | B2 | * | 4/2011  | Lee et al. ................ 375/240.16 |
| 2004/0062445 | A1 | * | 4/2004  | Kim et al. .................... 382/238 |
| 2005/0084011 | A1 | * | 4/2005  | Song et al. ............... 375/240.12 |
| 2006/0008038 | A1 | * | 1/2006  | Song et al. .................... 375/350 |
| 2006/0133501 | A1 | * | 6/2006  | Lee et al. ................ 375/240.16 |
| 2007/0177811 | A1 | * | 8/2007  | Yang .............................. 382/233 |
| 2007/0177812 | A1 | * | 8/2007  | Yang .............................. 382/233 |
| 2007/0177813 | A1 | * | 8/2007  | Yang .............................. 382/233 |
| 2007/0201551 | A1 | * | 8/2007  | Wang et al. ................ 375/240.1 |
| 2008/0130750 | A1 | * | 6/2008  | Song ...................... 375/240.16 |
| 2008/0219353 | A1 | * | 9/2008  | Chang .................... 375/240.21 |
| 2008/0304760 | A1 | * | 12/2008 | Lee et al. ....................... 382/238 |
| 2008/0317131 | A1 | * | 12/2008 | Lee et al. ................ 375/240.16 |
| 2009/0003455 | A1 | * | 1/2009  | Joung et al. ............. 375/240.24 |
| 2009/0279608 | A1 | * | 11/2009 | Jeon et al. ............... 375/240.16 |
| 2010/0027881 | A1 | * | 2/2010  | Kim et al. ...................... 382/166 |
| 2010/0183068 | A1 | * | 7/2010  | Pandit et al. ............. 375/240.02 |
| 2010/0232507 | A1 | * | 9/2010  | Cho et al. ................ 375/240.16 |
| 2011/0044550 | A1 | * | 2/2011  | Tian et al. ...................... 382/238 |

FOREIGN PATENT DOCUMENTS

| JP | 2000-134630 A | 5/2000 |
| JP | 2002-204353 A | 7/2002 |
| JP | 2005-309737 A | 11/2005 |
| JP | 2006-235158 A | 9/2006 |
| JP | 2009-523355 A | 6/2009 |
| JP | 2009-530960 A | 8/2009 |
| KR | 10-2006-0060350 A | 6/2006 |
| KR | 10-0856411 B1 | 8/2008 |
| WO | WO 2008084996 A1 * | 7/2008 |

\* cited by examiner

*Primary Examiner* — Jason M Repko
*Assistant Examiner* — Gandhi Thirugnanam
(74) *Attorney, Agent, or Firm* — Sughrue Mion, PLLC

(57) ABSTRACT

A method and apparatus for compensating for illumination of a reference block and a method and apparatus for encoding an image, using the illumination compensation method and apparatus, are provided. The method of compensating for illumination of a reference block includes: predicting the mean values of pixels of a current block and a reference block, based on restored values of pixels neighboring the current block, and restored values of pixels neighboring the reference block; and based on the predicted mean value of the pixels of the current block, the predicted mean value of the pixels of the reference block, and the values of the pixels of the current block and the reference block, determining an illumination compensation parameter.

12 Claims, 8 Drawing Sheets

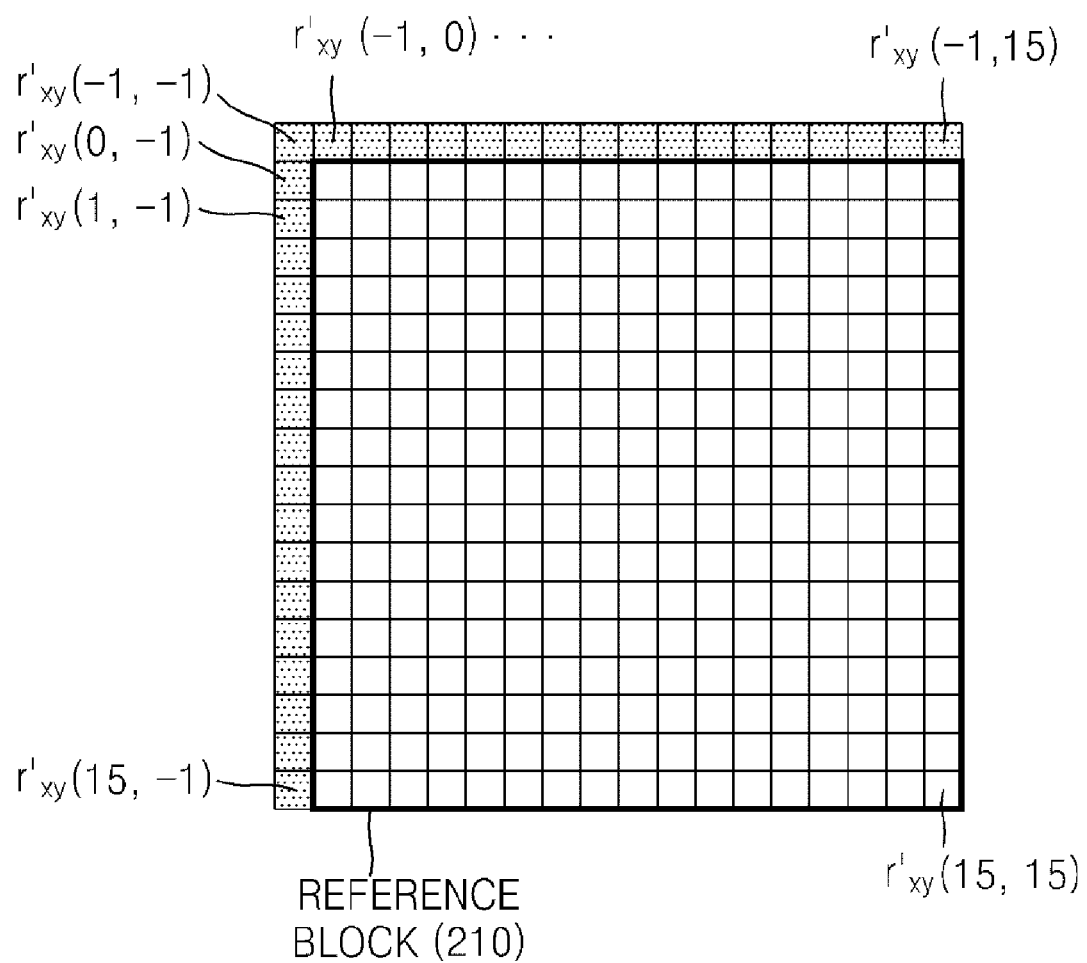

CURRENT BLOCK (220)

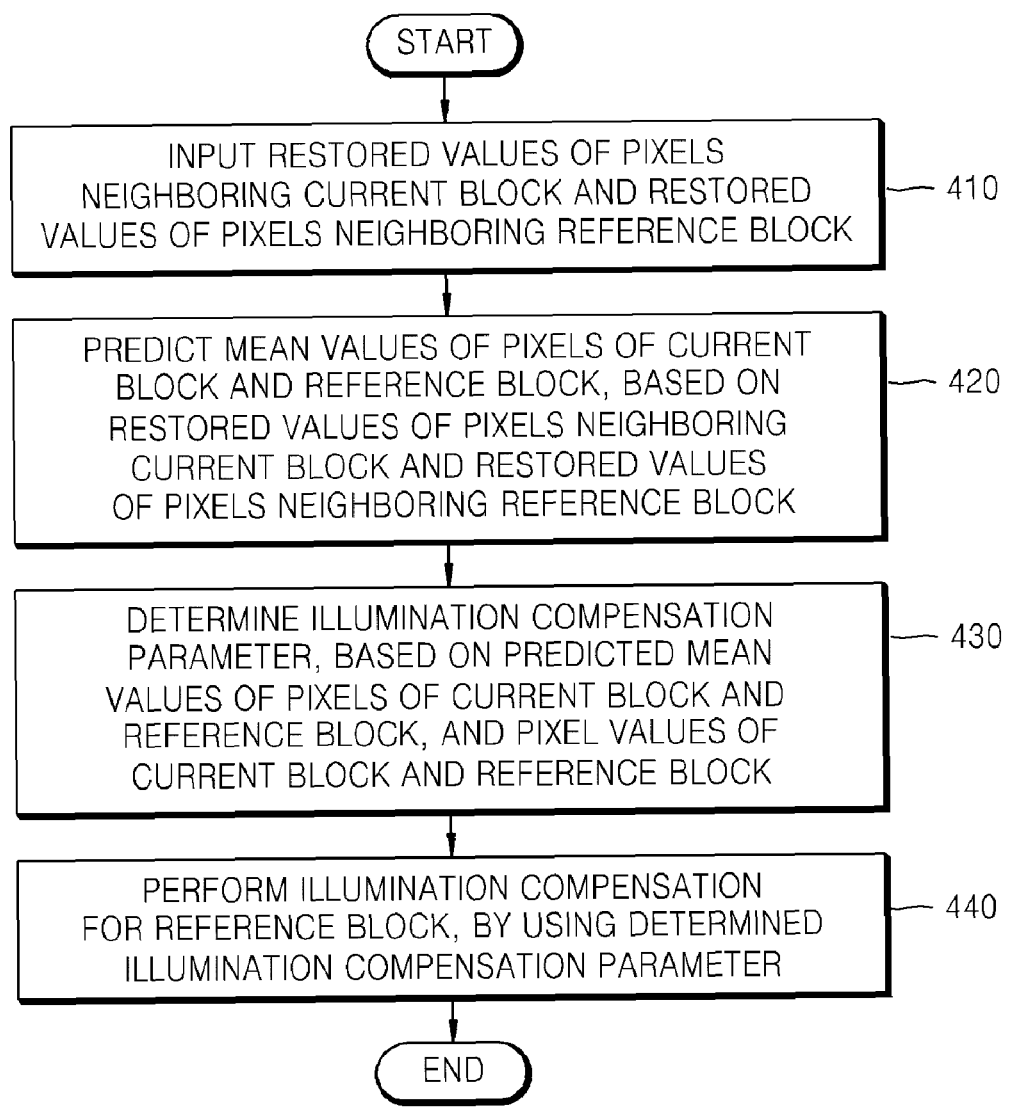

METHOD AND APPARATUS FOR ILLUMINATION COMPENSATION AND METHOD AND APPARATUS FOR ENCODING AND DECODING IMAGE BASED ON ILLUMINATION COMPENSATION

CROSS-REFERENCE TO RELATED PATENT APPLICATIONS

This application claims the benefit of Korean Patent Application No. 10-2007-0056760, filed on Jun. 11, 2007, in the Korean Intellectual Property Office, the disclosure of which is incorporated herein in its entirety by reference.

BACKGROUND OF THE INVENTION

1. Field of the Invention

The present invention relates to an illumination compensation method and apparatus, and more particularly, to a method and apparatus for compensating for illumination for image encoding and decoding.

2. Description of the Related Art

In multi-view coding (MVC) for 3-dimensional (3D) display applications, when prediction between neighboring views is performed, illumination changes between the neighboring views occur due to an incorrectly calibrated camera, different perspective projection directions, and different reflection effects, and as a result, encoding efficiency is lowered. In addition, in the case of a single view, the encoding efficiency is lowered due to illumination changes caused by screen switching and the like.

In order to solve these problems, the H.264 standard uses a weighted prediction technique.

This weighted prediction technique is applied to motion compensation at a slice level, and illumination is compensated for according to an appropriate weighted factor W and an additional offset O. An improved method for this weighted prediction technique is illumination change-adaptive motion estimation/compensation (ICA ME/MC).

According to ICA ME/MC, in the case of a Y component in the YUV color format, ICA ME/MC is performed in units of 16×16 blocks, and a difference value of illumination change (DVIC) in relation to each macroblock is obtained.

In ICA ME/MC, there are two modes. One is an IC-inter 16×16 mode which uses ICA ME/MC, and is used in a P or B slice. The other mode is an IC-direct 16×16 mode which does not use ICA ME/MC and is used only in a B slice. In order to compensate for local illumination change, a 1-bit flag, i.e., mb_ic_flag, is required for each of the inter 16×16 block mode and the direct 16×16 block mode.

Since there are very high correlations between the DVIC of a current block and the DVICs of neighboring blocks, the DVIC of the current block is transmitted by obtaining and encoding the difference between the DVIC of the current block and the DVICs of the neighboring blocks.

The ICA ME/MC in units of macroblocks for an inter 16×16 mode will now be explained.

For ICA ME/MC, a new sum of absolute differences (SAD) should be defined. Assuming that a pixel at coordinates (i,j) of a current frame is f(i,j), and a pixel at coordinates (i,j) of a reference frame is r(i,j), the SAD of blocks of a size of S×T is calculated according to Equation 1 below. Here, S×T may be 16×16, 16×8, 8×16, 8×8, 8×4, 4×8, and 4×4.

$$SAD(x, y) = \sum_{i=m}^{m+S-1} \sum_{j=n}^{n+T-1} |f(i, j) - r(i+x, j+y)| \quad \text{(Equation 1)}$$

Here, (x,y) is a candidate motion vector, and (m,n) is the position of a current block.

In order to compensate for illumination change, a new SAD is required. The new SAD is obtained according to Equations 2 and 3 below:

$$M_{cur} = \frac{1}{S \times T} \sum_{i=m}^{m+S-1} \sum_{j=n}^{n+T-1} f(i, j) \quad \text{(Equation 2)}$$

$$M_{ref}(p, q) = \frac{1}{S \times T} \sum_{i=p}^{p+S-1} \sum_{j=q}^{q+T-1} r(i, j)$$

Here, Mcur is the mean value of pixels of a current block, and Mref is the mean value of pixels in a reference block. Also, (p,q) is the position of the reference block. The new SAD, i.e., NewSAD(x,y) is obtained according to Equation 3 below:

$$NewSAD(x, y) = \sum_{i=m}^{m+S-1} \sum_{j=n}^{n+T-1} |\{f(i, j) - M_{cur}\} - \{r(i+x, j+y) - M_{ref}(m+x, n+y)\}| \quad \text{(Equation 3)}$$

In ICA ME/MC, a block which minimizes the NewSAD (x,y), for example, a 16×16 block, is searched for based on Equation 3, and a motion vector (MV) corresponding to the block is found.

If the motion vector MV(x',y') minimizing the NewSAD (x,y) is determined, an illumination compensation residual signal NewR(i,j) is determined according to Equation 4 below:

$$\begin{aligned} NewR(i, j) &= \{f(i, j) - M_{cur}\} - \{r(i+x', j+y') - \\ &\quad M_{ref}(m+x', n+y')\} \\ &= \{f(i, j) - r(i+x', j+y')\} - \\ &\quad \{M_{cur} - M_{ref}(m+x', n+y')\} \\ &= \{f(i, j) - r(i+x', j+y')\} - DVIC \end{aligned} \quad \text{(Equation 4)}$$

In this case, the mb_ic_flag that is the 1-bit flag is stored in a syntax in order to indicate whether or not ICA ME/MC is used. The DPCM value of the DVIC is also included in the syntax. In the current example, if the mb_ic_flag is 0, it indicates that ICA MC for a current block has not been performed. If the mb_ic_flag is 1, it indicates that ICA MC for the current block has been performed.

Also, if the mb_ic_flag is 1, the ICA ME/MC unit of a decoding apparatus obtains a restored pixel by using Equation 5 below:

$$f'(i, j) = \{NewR''(x', y', i, j) + r(i+x', j+y')\} + \quad \text{(Equation 5)}$$

-continued $$\{M_{cur} - M_{ref}(m+x', n+y')\}$$
$$= \{NewR''(x', y', i, j) + r(i+x', j+y')\} + DVIC$$

Here, NewR"(i,j) is a restored illumination compensation residual signal, and f'(i,j) is a restored pixel in a current frame.

In this conventional ICA ME/MC method, DVIC information should be transmitted, and as a result, the encoding efficiency is lowered.

A method of compensating for illumination capable of omitting DVIC information by improving the conventional illumination method has been suggested.

In order to omit the DVIC information, an illumination-compensated reference block is generated by using Equation 6 below:

$$\hat{f}(i,j) = a_{x,y} \cdot r'_{x,y}(i,j) + b_{x,y} \qquad \text{(Equation 6)}$$

In Equation 6, $a_{x,y}$ and $b_{x,y}$ have values varying with respect to a motion vector (x,y), and have constant values in relation to each motion vector. Also, $r'_{x,y}(i,j)$ is a motion compensated reference block, and $\hat{f}(i,j)$ is an illumination-compensated reference block. In the illumination compensation method using Equation 6, calculation of $a_{x,y}$ and $b_{x,y}$ is performed by using restored pixels neighboring a current block according to a linear regression method, an average of difference based prediction method, and a difference of average based prediction method. Accordingly, the DVIC information can be omitted. However, the illumination compensation method omitting the DVIC information calculates $a_{x,y}$ and $b_{x,y}$ from the restored pixels neighboring the current block, and therefore the performance of illumination change prediction by the method is lower than the performance by a method of calculating $a_{x,y}$ and $b_{x,y}$ by using the current block.

SUMMARY OF THE INVENTION

The present invention provides an improved method and apparatus for illumination compensation, in which an illumination compensation parameter is determined by using available pixel information of a current block, and even with transmission of a smaller illumination compensation parameter, the performance of illumination compensation can be improved, and a method and apparatus for encoding and decoding an image using the illumination compensation method and apparatus.

According to an aspect of the present invention, there is provided a method of compensating for illumination of a reference block, including: receiving inputs of restored values of pixels neighboring a current block and restored values of pixels neighboring the reference block; predicting the mean values of pixels of the current block and the reference block, based on the input restored values of the pixels neighboring the current block and the input restored values of the pixels neighboring the reference block; based on the predicted mean value of the pixels of the current block, the predicted mean value of the pixels of the reference block, and the values of the pixels of the current block and the reference block, determining an illumination compensation parameter for illumination compensation of the reference block; and performing illumination compensation of the reference block, by using the determined illumination compensation parameter.

According to another aspect of the present invention, there is provided an apparatus for compensating for illumination of a reference block, including: a mean value prediction unit predicting the mean values of pixels of a current block and the reference block, based on restored values of pixels neighboring the current block and restored values of pixels neighboring the reference block; an illumination compensation parameter calculation unit, based on the predicted mean value of the pixels of the current block, the predicted mean value of the pixels of the reference block, and the values of the pixels of the current block and the reference block, determining an illumination compensation parameter for illumination compensation of the reference block; and an illumination compensation unit performing illumination compensation of the reference block, by using the determined illumination compensation parameter.

According to another aspect of the present invention, there is provided a method of encoding an image based on illumination compensation, the method including: determining a reference block to be used for generating a predicted block of a current block; determining an illumination compensation parameter for illumination compensation of the determined reference block; by using the determined illumination compensation parameter, performing illumination compensation of the determined reference block; generating the predicted block of the current block, by using the illumination-compensated reference block, and by encoding the difference value between the generated predicted block and the current block, generating a bitstream; and storing information on the determined illumination compensation parameter in a predetermined area of the generated bitstream.

According to another aspect of the present invention, there is provided an apparatus for encoding an image based on illumination compensation, the apparatus including: a prediction unit determining a reference block to be used for generating a predicted block of a current block; an illumination compensation unit determining an illumination compensation parameter for illumination compensation of the determined reference block, and by using the determined illumination compensation parameter, performing illumination compensation of the reference block; and an encoding unit generating the predicted block of the current block, by using the illumination-compensated reference block, and by encoding the difference value between the generated predicted block and the current block, generating a bitstream, and storing information on the determined illumination compensation parameter in a predetermined area of the generated bitstream.

According to another aspect of the present invention, there is provided a method of decoding an image based on illumination compensation, the method including: extracting prediction mode information and an illumination compensation parameter from a current block to be decoded, from a received bitstream; determining a reference block of the current block, by using the extracted prediction mode information; and performing illumination compensation of the determined reference block, by using the extracted illumination compensation parameter.

BRIEF DESCRIPTION OF THE DRAWINGS

The above and other features and advantages of the present invention will become more apparent by describing in detail exemplary embodiments thereof with reference to the attached drawings in which:

FIGS. 2A and 2B are diagrams for explaining a method of calculating a predicted mean value of pixels of a current block and a reference block, and a method of determining an illumination compensation parameter, according to an exemplary embodiment of the present invention;

FIG. 3B is a diagram illustrating an encoding sequence for a 4×4 mode, according to an exemplary embodiment of the present invention;

FIG. 4 is a flowchart illustrating a method of compensating for illumination, according to an exemplary embodiment of the present invention;

DETAILED DESCRIPTION OF THE INVENTION

The present invention will now be described more fully with reference to the accompanying drawings, in which exemplary embodiments of the invention are shown.

Figure 1:
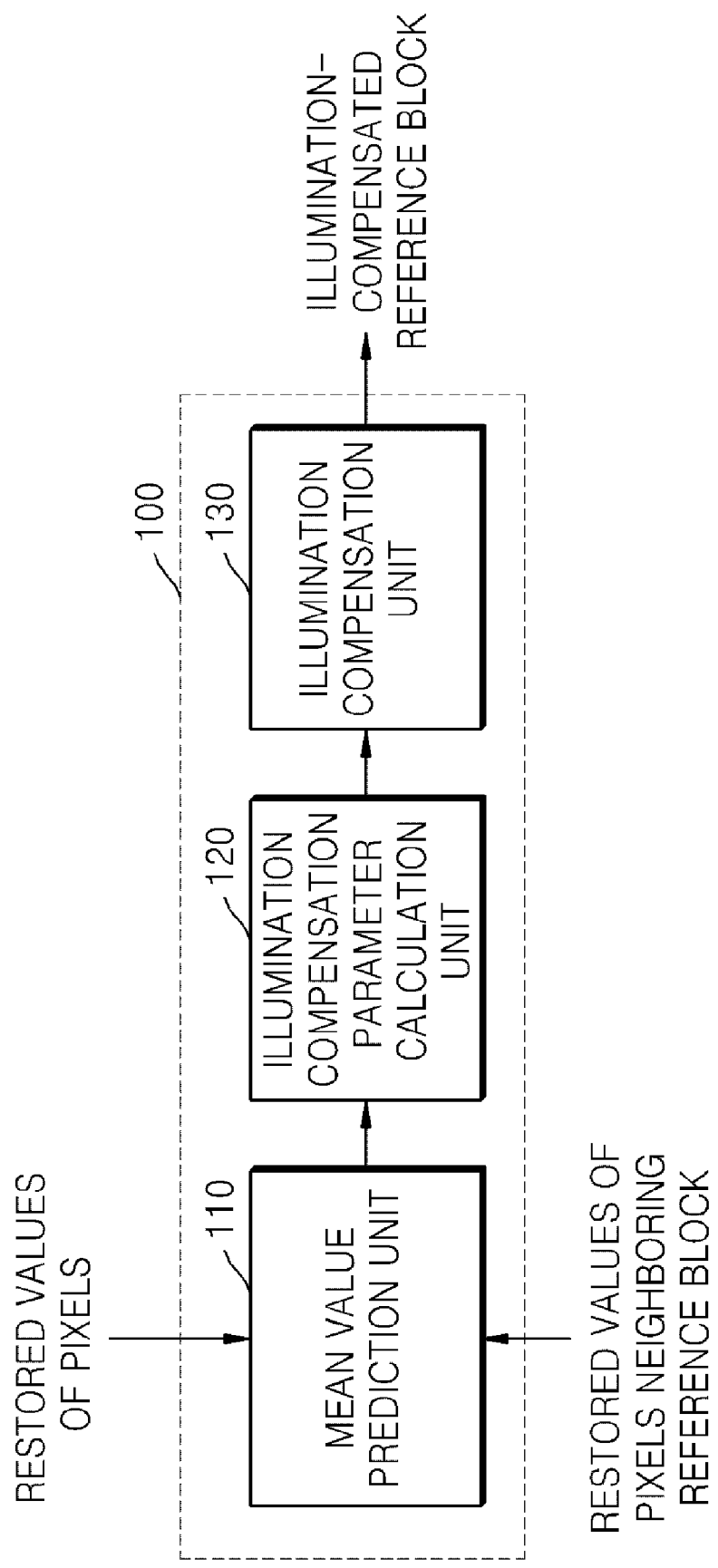
FIG. 1 is a block diagram illustrating an apparatus for compensating for illumination, according to an exemplary embodiment of the present invention.

FIG. 1 is a block diagram illustrating an apparatus for compensating for illumination according to an embodiment of the present invention.

Referring to FIG. 1, the apparatus for compensating for illumination according to the current embodiment of the present invention includes a mean value prediction unit 110, an illumination compensation parameter calculation unit 120, and an illumination compensation unit 130.

The mean value prediction unit 110 predicts the mean values (direct current, DC) of pixels of a current block and a reference block, based on restored values of pixels neighboring the current block and restored values of pixels neighboring the reference block.

The illumination compensation parameter calculation unit 120 determines an illumination compensation parameter for compensating for illumination of the reference block, based on the predicted mean value of the pixels of the current block, the predicted mean value of the pixels of the reference block, and the pixels of the current block and the reference block. More specifically, the illumination compensation parameter calculation unit 120 determines the illumination compensation parameter, based on a value obtained by subtracting the predicted mean value of the pixels of the current block, from the pixels of the current block, and a value obtained by subtracting the predicted mean value of the pixels of the reference block, from the pixels of the reference block. That is, the illumination compensation parameter calculation unit 120 determines the illumination compensation parameter, based on the pixels of the current block and the reference block, in which the mean value components are removed. A detailed process of determining the illumination compensation parameter will be explained later.

The illumination compensation unit 130 generates an illumination-compensated reference block of a current block, by using an illumination compensation parameter, predicted mean values of the current block and the reference block, and the values of pixels of the reference block. Here, the illumination-compensated reference block corresponds to a predicted block of the current block. Also, in the case of a single view, the reference block may be a block in a restored previous frame or a block in an already restored different color component frame in the current frame. In the case of multi-view coding (MVC), the reference block may be a block in any one of a plurality of restored frames in a neighboring view.

Figure 2B:
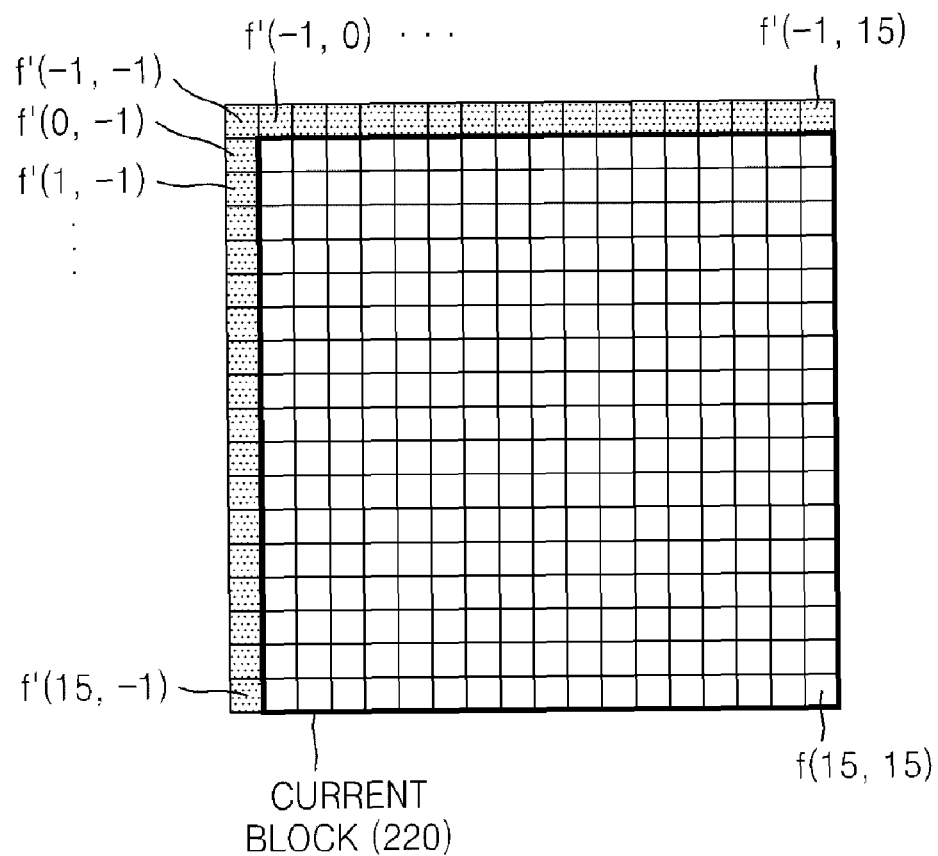

FIGS. 2A and 2B are diagrams for explaining a method of calculating a predicted mean value of pixels of a current block and a reference block using the apparatus of FIG. 1, and a method of determining an illumination compensation parameter using the apparatus of FIG. 1, according to an embodiment of the present invention.

Referring to FIG. 2A, the block indicated by thick solid lines is a restored reference block 210 of 16×16 size corresponding to a motion vector (x,y) in a reference frame. A restored pixel value at a position (i,j) in the restored reference block 210 corresponding to the motion vector (x,y) is expressed as $r'_{x,y}(i,j)$. In this case, the superscript symbol (') indicates a restored value. Meanwhile, shaded pixels indicate restored pixels neighboring the restored reference block 210. Referring to FIG. 2B, the block indicated by thick solid lines is a restored current block 220 of 16×16 size. The value of an original pixel at a position (i,j) in the restored current block 220 is expressed as f(i,j). The shaded pixels indicate restored pixels neighboring the restored current block 220. As in FIG. 2A, the superscript symbol (') indicates a restored value in FIG. 2B.

By considering that the difference between illuminations of pixels in a block and pixels neighboring the block is not significant, the mean value prediction unit 110 predicts the mean value of the pixels of the current block to be the mean value of the values of the pixels neighboring the current block, and predicts the mean value of the pixels of the reference block to be the mean value of the values of the pixels neighboring the reference block. Referring to FIGS. 2A and 2B, in the case of a 16×16 mode, a mean value $DC_r$ of the pixels neighboring the restored reference block 210 and a mean value $DC_f$ of the pixels neighboring the restored current block 220 can be calculated using Equation 7 below:

$$DC_r(i, j) = \frac{1}{32} \sum_{k=0}^{15} (r'_{xy}(k, -1) + r'_{xy}(-1, k)) \quad \text{(Equation 7)}$$

$$DC_f(i, j) = \frac{1}{32} \sum_{k=0}^{15} (f'_{xy}(k, -1) + f'_{xy}(-1, k))$$

As described above, by considering that the difference between illuminations of pixels in a block and pixels neighboring the block is not significant, the mean value prediction unit 110 determines the calculated mean value $DC_r$ of the pixels neighboring the restored reference block 210 and the calculated mean value $DC_f$ of the pixels neighboring the restored current block 220 as the predicted mean values of the restored reference block 210 and the restored current block 220, respectively.

Meanwhile, the process of predicting the mean values of pixels of a current block and a reference block according to the current embodiment can be broadly classified into a variable DC mode and a fixed DC mode. In the variable DC mode, a 16×16 block is divided into blocks of 16×16, 8×8, and 4×4 sizes, and then, an optimum mode is determined. In the fixed DC mode, one type of block is determined from among 16×16, 8×8, and 4×4 blocks, and according to the determined block size, the mean value of one slice, or one frame, or a whole image is predicted. Similarly to Equation 7 described above, when the mean values of the pixels of a current block and a reference block are predicted in units of blocks of 8×8 and 4×4 sizes, the mean values can be predicted by using Equations 8 and 9 below:

$$DC_r(i, j) = \frac{1}{16} \sum_{k=0}^{8} (r'_{xy}(k, -1) + r'_{xy}(-1, k))$$ (Equation 8)

$$DC_f(i, j) = \frac{1}{16} \sum_{k=0}^{8} (f'_{xy}(k, -1) + f'_{xy}(-1, k))$$

$$DC_r(i, j) = \frac{1}{8} \sum_{k=0}^{4} (r'_{xy}(k, -1) + r'_{xy}(-1, k))$$ (Equation 9)

$$DC_f(i, j) = \frac{1}{8} \sum_{k=0}^{4} (f'_{xy}(k, -1) + f'_{xy}(-1, k))$$

Meanwhile, assuming that an illumination compensation parameter is $a_{x,y}$, the size of each of the current block and the reference block is M×N (M, and N are positive integers), the pixel value at a position (i,j) ($0 \leq i \leq M$, $0 \leq j \leq N$, i and j are integers) in the current block is f(i,j), the predicted value of the pixel value at the position (i,j) in the current block is $f_E(i,j)$, the restored value of the pixel value at a position (i,j) in the reference block is $r'_{x,y}(i,j)$, the illumination compensation unit 130 can predict the predicted value $f_E(i,j)$ of the pixel value in the current block, by using Equation 10 below:

$$f_E(i,j) = a_{x,y}(r'_{x,y}(i,j) - DC_r) + DC_f$$ (10)

If $DC_f$ that is the mean value of the pixels neighboring the current block is transposed to the left side, it can be known that the illumination compensation parameter ($a_{x,y}$) is determined based on a value obtained by subtracting the predicted mean value of the pixels of the current block from the pixels of the current block, a value obtained by subtracting the predicted mean value of the pixels of the reference block from the pixels of the reference block. In the case of an 8-bit image, the predicted pixel value ($f_E(i,j)$) of the current block calculated using Equation 10 may be clipped into values between [0,255].

Referring again to FIG. 1, an illumination-compensated reference block, i.e., an illumination-compensated predicted block of the current block, is generated in the illumination compensation unit 130, by multiplying the difference between the restored pixels of the reference block and the mean value of the pixels neighboring the reference block by the predetermined illumination compensation parameter ($a_{x,y}$), and adding the mean value of the pixels neighboring the current block. Then, the illumination compensation parameter calculation unit 120 determines an illumination compensation parameter ($a_{x,y}$) which minimizes the difference between the illumination-compensated pixels ($f_E(i,j)$) of the reference block and the original pixels ($f_E(i,j)$) of the current block. In this case, the illumination compensation parameter calculation unit 120 applies each of a predetermined number of predefined illumination compensation parameters, for example, n predefined illumination compensation parameters {a0, a1, ..., an}, thereby calculating the difference values between the illumination-compensated pixels ($f_E(i,j)$) of the reference block and the original pixels ($f_E(i,j)$) of the current block. Then, the illumination compensation parameter calculation unit 120 determines an illumination compensation parameter minimizing the difference value, and can transmit a predetermined index information item indicating the determined illumination compensation parameter, to a decoding apparatus. In this case, with only the predefined index information item, the decoding apparatus can determine the illumination compensation parameter.

Figure 3A:
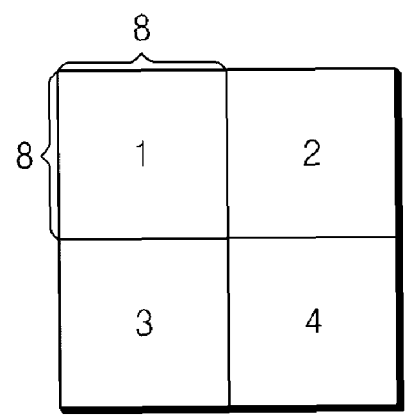
FIG. 3A is a diagram illustrating an encoding sequence for an 8×8 mode.

Meanwhile, when the illumination compensation parameter is determined, a macroblock may be divided into blocks of a variety of sizes such as 16×16, 8×8, and 4×4, and then, each block may be made to have an independent illumination compensation parameter. FIG. 3A is a diagram illustrating an encoding sequence for an 8×8 mode, and FIG. 3B is a diagram illustrating an encoding sequence for a 4×4 mode, according to an embodiment of the present invention;

Referring to FIGS. 3A and 3B, when an illumination compensation parameter is determined for each of a 8×8 or 4×4 block unit, each block is processed from the left-hand side to the right-hand side and from the top to the bottom, thereby determining an illumination compensation parameter.

Modes for determining an illumination compensation parameter can be broadly classified into a variable mode and a fixed mode. The variable mode may include three modes such as a 16×16 mode, an 8×8 mode, and a 4×4 mode. The illumination compensation parameter value may vary with respect to each mode. The fixed mode may include three modes such as a 16×16 mode, an 8×8 mode, and a 4×4 mode, but each 16×16 block has one illumination compensation parameter. Accordingly, one fixed value is used for all the illumination compensation parameters in all modes in a 16×16 block. In other words, the fixed mode can have block modes of different sizes (a 16×16 mode, an 8×8 mode, and a 4×4 mode) for a slice, a frame, or a whole image as the variable mode. However, while each block can variably have a different illumination compensation parameter in the variable mode, sub-blocks in a block of a predetermined size have identical illumination compensation parameters in the fixed mode. For example, in the fixed mode, sub-blocks in a 16×16 block share one illumination compensation parameter, but can have an illumination compensation parameter different from that of other 16×16 blocks. In this case, in the variable mode, each sub-block in a 16×16 block can have an illumination compensation parameter different from those of other sub-blocks.

Also, in encoding of a 16×16 block, when a 16×16 mode, an 8×8 mode, and a 4×4 mode are applied, one, four, and 16 illumination compensation parameters, respectively, should be transmitted. When the number of illumination compensation parameters increase, the amount of data that should be transmitted may increase. Accordingly, a set of illumination compensation parameters are defined in an encoding apparatus and a decoding apparatus, in advance, and then, a most appropriate illumination compensation parameter is determined from among the illumination compensation parameters included in the illumination compensation parameter set. Then, by transmitting only index information of the determined illumination compensation parameter, the amount of data to be transmitted can be reduced. Also, between the variable mode and the fixed mode, when the fixed mode in which the size of a block to be applied is fixed is used, the amount of mode information can be reduced.

FIG. 4 is a flowchart illustrating a method of compensating for illumination according to an embodiment of the present invention.

In operation 410, inputs of restored values of pixels neighboring a current block and restored values of pixels neighboring a reference block are received. Here, in the case of a single view, the reference block may be a block in a restored previous frame or a block in an already restored different color component frame in a current frame. In the case of multi-view coding (MVC), the reference block may be a block in any one frame from among restored frames in a neighboring view.

In operation 420, the mean values of the pixels of the current block and the reference block are predicted based on the inputs of the restored values of pixels neighboring a current block and the restored values of pixels neighboring a reference block. As described above, by considering that the difference between illuminations of pixels in a block and pixels neighboring the block is not significant, the mean value of the values of the pixels neighboring the current block can be directly predicted to be the mean value of the pixels of the current block, and the mean value of the values of the pixels neighboring the reference block can be directly predicted to be the mean value of the pixels of the reference block.

In operation 430, an illumination compensation parameter for illumination compensation of the reference block is determined based on the predicted mean value of the pixels of the current block, the predicted mean value of the pixels of the reference block, and the values of the pixels of the current block and the reference block. As Equation 10 described above, an illumination-compensated reference block, i.e., an illumination-compensated predicted block of the current block, is generated by multiplying the difference between the restored pixels of the reference block and the mean value of the pixels neighboring the reference block by a predetermined illumination compensation parameter, and then, adding the mean value of the pixels neighboring the current block. Then, an illumination compensation parameter which minimizes the difference between the illumination-compensated pixels of the reference block and the original pixels of the current block is determined.

In operation 440, by using the determined illumination compensation parameter, illumination compensation of the reference block is performed.

Figure 5:
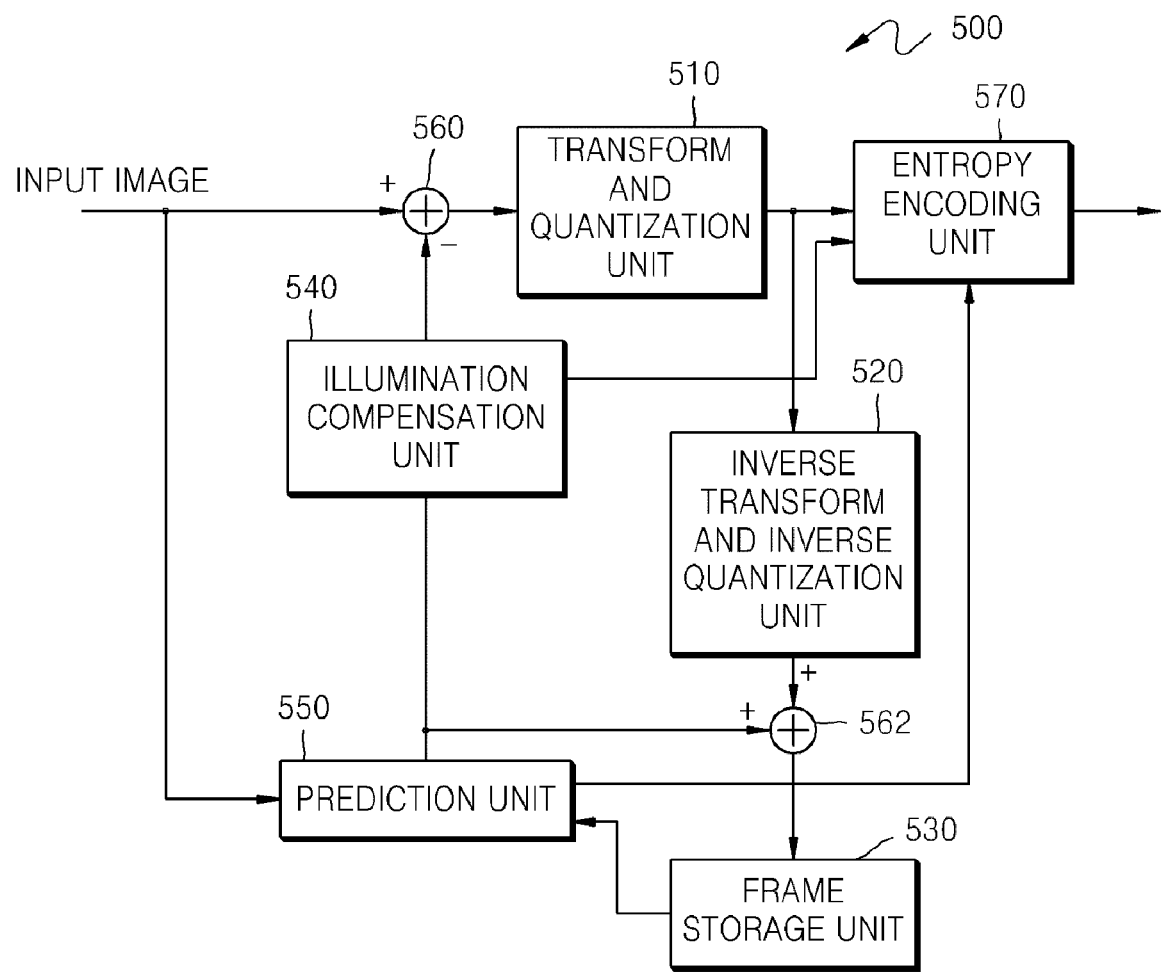
FIG. 5 is a block diagram illustrating a structure of an apparatus for encoding an image to which an illumination compensation apparatus is applied, according to an exemplary embodiment of the present invention.

FIG. 5 is a block diagram illustrating a structure of an apparatus 500 for encoding an image to which an illumination compensation apparatus is applied according to an embodiment of the present invention.

Referring to FIG. 5, the apparatus 500 for encoding an image according to the current embodiment of the present invention includes a transform and quantization unit 510, an inverse transform and inverse quantization unit 520, a frame storage unit 530, an illumination compensation unit 540, a prediction unit 550, a subtraction unit 560, and an addition unit 562.

The transform and quantization unit 510 transforms input image data in order to remove spatial redundancy of the image data. Also, by quantizing the transform coefficient values obtained through transform encoding according to a predetermined quantization step, N×M data that is 2-dimensional (2D) data formed by quantized transform coefficient values is obtained. An example of an image transform which can be used is discrete cosine transform (DCT). The quantization is performed according to the predetermined quantization step.

The inverse transform and inverse quantization unit 520 inverse-quantizes the image data quantized in the transform and quantization unit 510, and inverse-transforms, for example, performs inverse-DCT of the inverse-quantized image data.

The addition unit 562 adds a predicted image output from the prediction unit 550, and the data restored in the inverse transform and inverse quantization unit 520, thereby generating a restored image. The frame storage unit 530 stores the restored image in units of frames.

The prediction unit 550 generates a predicted block of the current block which is to be encoded, and determines a reference block for generating the predicted block. As described above, in the case of a single view, the reference block may be a block in a restored previous frame or a block in an already restored different color component frame in the current frame. In the case of MVC, the reference block may be a block in any one of a plurality of restored frames in a neighboring view.

The illumination compensation unit 540 determines an illumination compensation parameter for illumination compensation of the determined reference block. By using the determined illumination compensation parameter, the illumination compensation unit 540 performs illumination compensation of the reference block, thereby outputting an illumination-compensated reference block. The output illumination-compensated reference block corresponds to the predicted block of the current block, and a residual block that is the difference between the output illumination-compensated reference block and the input current block is encoded. Meanwhile, the information on the illumination compensation parameter determined in the illumination compensation unit 540 is stored in a predetermined area of a bitstream which is generated in the entropy encoding unit 570 so that a decoding apparatus can determine an illumination compensation parameter for illumination compensation of a reference block. Since the illumination compensation unit 540 performs the same function as that of the illumination compensation apparatus 100 illustrated in FIG. 1, a detailed explanation of the illumination compensation unit 540 will not be provided.

Figure 6:
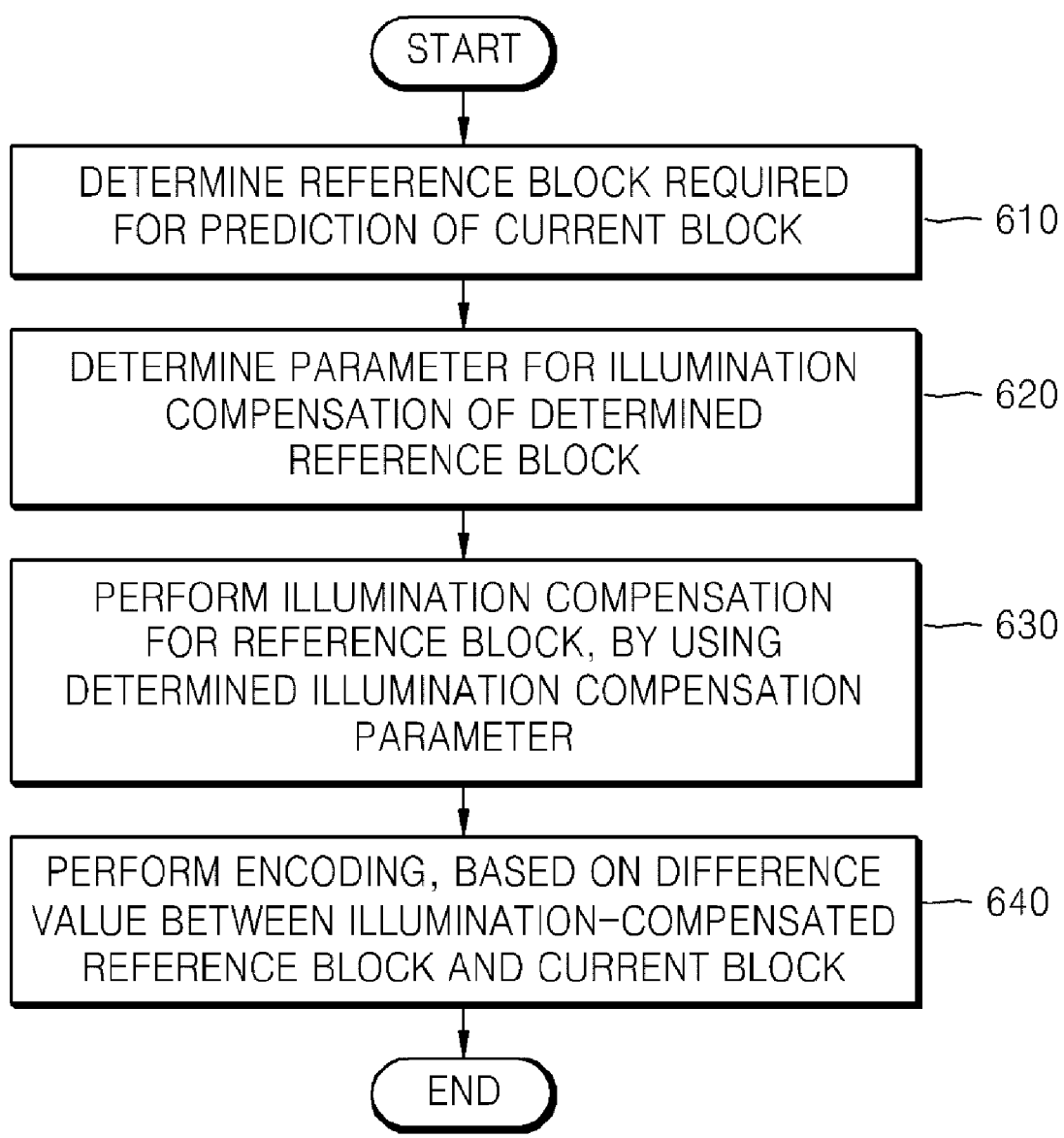
FIG. 6 is a flowchart illustrating a method of encoding an image to which an illumination compensation method is applied, according to an exemplary embodiment of the present invention.

FIG. 6 is a flowchart illustrating a method of encoding an image to which an illumination compensation method is applied, according to an embodiment of the present invention.

Referring to FIG. 6, a reference block which is to be used for generating a predicted block of a current block is determined in operation 610.

In operation 620, an illumination compensation parameter for illumination compensation of the determined reference block is determined.

As described above, an illumination-compensated reference block is generated by multiplying the difference between restored pixels of the reference block and the mean value of pixels neighboring the reference block by a predetermined weight, i.e., a predetermined illumination compensation parameter, and then, adding the mean value of the pixels neighboring the current block. Then, a weight which minimizes the difference between the illumination-compensated pixels of the reference block and the original pixels of the current block is determined as an illumination compensation parameter.

In operation 630, by using the determined illumination compensation parameter, illumination compensation of the reference block is performed.

In operation 640, by using the illumination-compensated reference block, a predicted block of the current block is generated, and by encoding the difference between the generated predicted block and the current block, a bitstream is generated.

In operation 640, information on the determined illumination compensation parameter is stored in a predetermined area of the generated bitstream.

Figure 7:
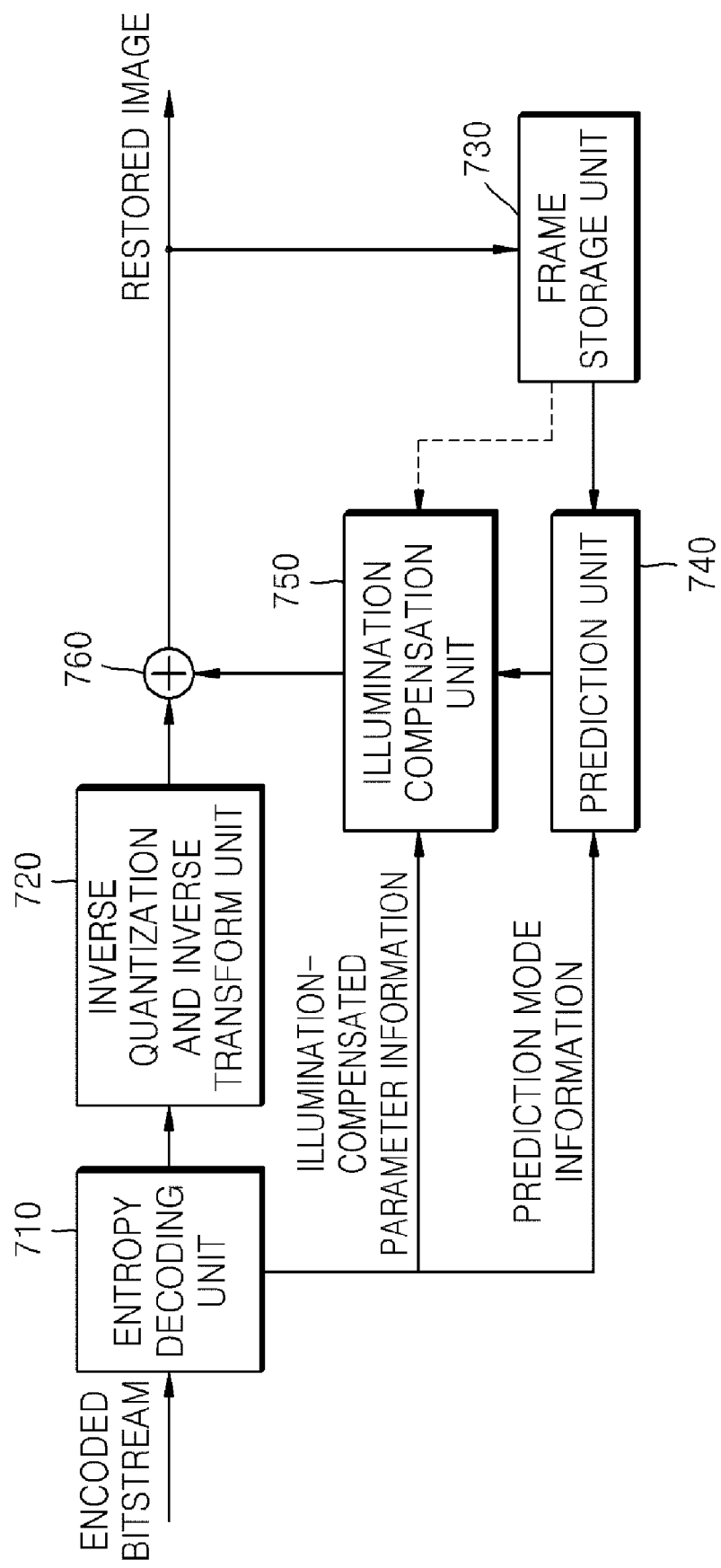
FIG. 7 is a block diagram illustrating a structure of an apparatus for decoding an image, according to an exemplary embodiment of the present invention.

FIG. 7 is a block diagram illustrating a structure of an apparatus for decoding an image, according to an embodiment of the present invention.

Referring to FIG. 7, the apparatus for decoding an image according to the current embodiment of the present invention includes an entropy decoding unit 710, an inverse quantization and inverse transform unit 720, a frame storage unit 730, a prediction unit 740, an illumination compensation unit 750, and an addition unit 760.

The entropy decoding unit 710 entropy-decodes an encoded bitstream, thereby extracting image data, prediction mode information, and illumination compensation parameter information. The entropy-decoded image data is input to the inverse quantization and inverse transform unit 720, the prediction mode information is input to the prediction unit 740, and the illumination compensation parameter information is input to the illumination compensation unit 750.

The inverse transform and inverse quantization unit 720 performs inverse transform and inverse quantization of the image data extracted in the entropy decoding unit 710. The addition unit 760 adds the image data which is inverse-quantized and inverse-transformed in the inverse transform and inverse quantization unit 720 and a predicted block illumination-compensated in the illumination compensation unit 750, thereby restoring an image. The frame storage unit 730 stores the restored image in units of frames.

The prediction unit 740 determines a reference block of a current block to be decoded, by using the prediction mode information extracted from the bitstream.

The illumination compensation unit 750 performs illumination compensation of the determined reference block, by using the illumination compensation parameter extracted from the bitstream, thereby generating an illumination-compensated reference block. The illumination-compensated reference block corresponds to the predicted block of the current block.

Figure 8:
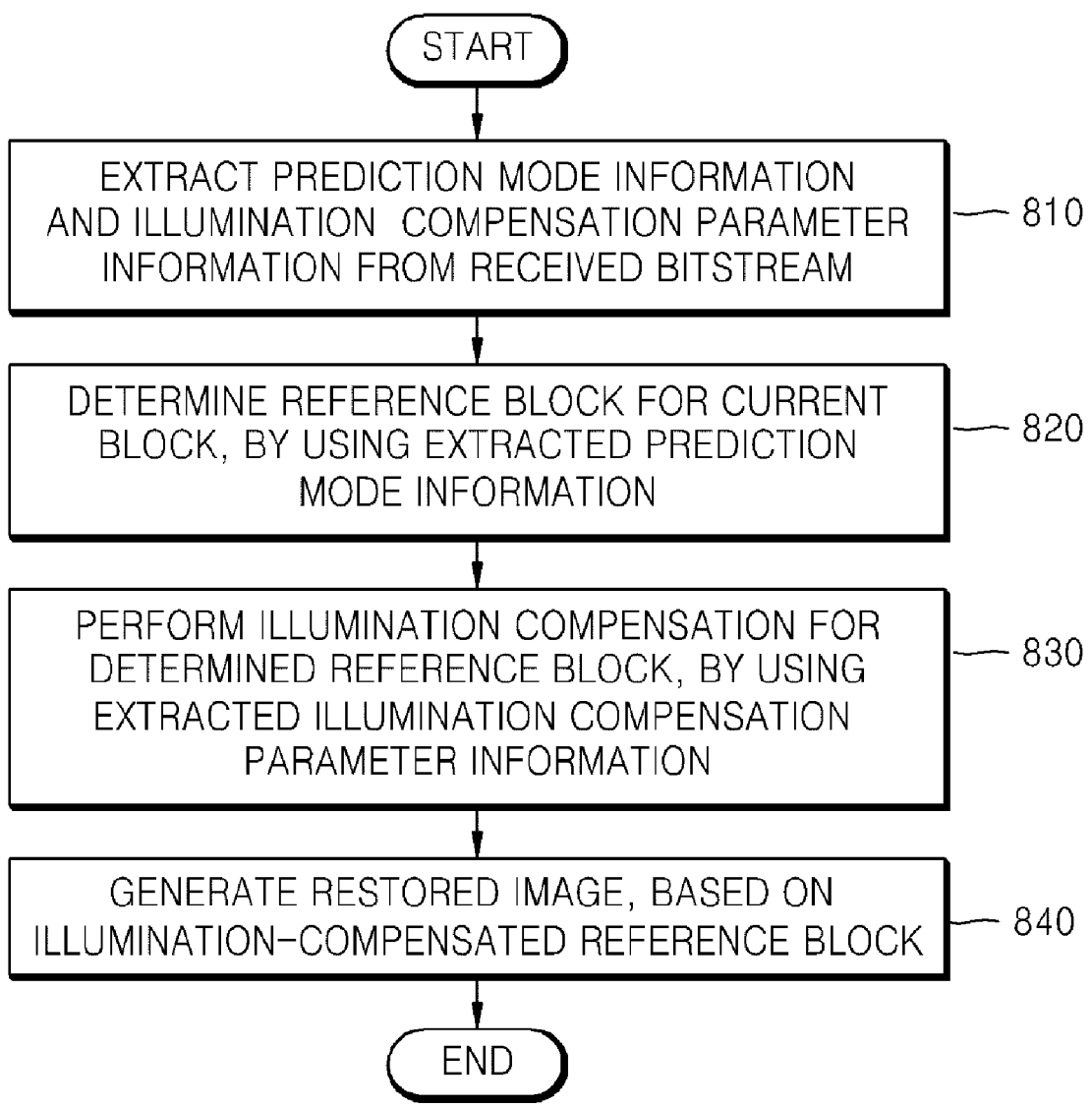
FIG. 8 is a flowchart illustrating a method of decoding an image, according to an exemplary embodiment of the present invention.

FIG. 8 is a flowchart illustrating a method of decoding an image, according to an embodiment of the present invention.

Referring to FIG. 8, prediction mode information and an illumination compensation parameter of a current block to be decoded are extracted from a received bitstream in operation 810.

In operation 820, by using the extracted prediction mode information, a reference block of the current block is determined.

In operation 830, by using the extracted illumination compensation parameter information, illumination compensation of the determined reference block is performed. The process of illumination compensation of the reference block can be performed by using Equation 10 described above.

In operation 840, by adding the illumination-compensated reference block and restored residual data, the current block is restored.

According to the present invention as described above, part of an illumination compensation parameter for illumination compensation of a reference block is predicted by using the pixel values of a current block. In this way, the image characteristic of the current block can be efficiently reflected, thereby improving the encoding efficiency of an image compared to the conventional technology in which an illumination compensation parameter using only neighboring pixels is used.

Also, according to the present invention, the pixel values of a current block can be efficiently predicted even with an illumination compensation parameter having a small amount of data, thereby improving encoding efficiency.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of compensating for illumination of a reference block, comprising:

receiving inputs of restored values of pixels neighboring a current block and restored values of pixels neighboring the reference block;

predicting mean values of pixels of the current block and the reference block, based on the input restored values of the pixels neighboring the current block and the input restored values of the pixels neighboring the reference block;

based on the predicted mean value of the pixels of the current block, the predicted mean value of the pixels of the reference block, and the values of the pixels of the current block and the reference block, determining an illumination compensation parameter for illumination compensation of the reference block; and performing illumination compensation of the reference block, by using the determined illumination compensation parameter.

2. The method of claim 1, wherein the predicting of the mean values of the pixels of the current block and the reference block comprises predicting the mean value of the values of the pixels neighboring the current block to be the mean value of the pixels of the current block, and predicting the mean value of the values of the pixels neighboring the reference block to be the mean value of the pixels of the reference block.

3. The method of claim 1, wherein the determining of an illumination compensation parameter for illumination compensation of the reference block further comprises determining an illumination compensation parameter which minimizes a difference between the pixels of an illumination-compensated reference block and the original pixels of the current block, the illumination-compensated reference block being generated by multiplying the difference between the restored pixels of the reference block and the mean value of the pixels neighboring the reference block, by a predetermined illumination compensation parameter, and then, adding the mean value of the pixels neighboring the current block.

4. The method of claim 1, wherein the determining of an illumination compensation parameter for illumination compensation of the reference block comprises:

assuming that an illumination compensation parameter is $a_{x,y}$, a size of each of the current block and the reference block is M×N, the pixel value at a position (i,j) in the current block is f(i,j), the predicted value of the pixel value at the position (i,j) in the current block is $f_E(i,j)$, the restored value of the pixel value at a position (i,j) in the reference block is $r'_{x,y}(i,j)$, generating the illumination-compensated reference block by using the following equation:

$$f_E(i,j) = a_{x,y}(r'_{x,y}(i,j) - DC_r) + DC_{fl}$$

where M, N, i and j are positive integers, $0 \leq i \leq M$, $0 \leq j \leq N$, wherein $DC_r$ is a mean value of the pixels neighboring a restored reference block, and wherein $DC_f$ is a mean value of the pixels neighboring a restored current block; and calculating a sum of the differences between each pixel value f(i,j) and the predicted value $f_E(i,j)$ of the current block, and determining an illumination compensation parameter $a_{x,y}$ which minimizes the sum of the differences.

5. The method of claim 1, wherein the determining of an illumination compensation parameter for illumination compensation of the reference block comprises determining an illumination compensation parameter from a predetermined number of predefined illumination compensation parameters so that the difference between the pixel values of the illumination-compensated reference block and the current block is minimized.

6. The method of claim 1, wherein the determining of an illumination compensation parameter for illumination compensation of the reference block is performed according to one of two modes comprising a variable mode in which a different illumination compensation parameter is determined for a block of a predetermined size, and a fixed mode in which an identical illumination compensation parameter is determined for sub blocks in the block of the predetermined size.

7. An apparatus for compensating for illumination of a reference block, comprising:
a processor;
a memory coupled to the processor, wherein the memory stores program instructions executable by the processor to implement:
a mean value prediction unit which predicts mean values of pixels of a current block and the reference block, based on restored values of pixels neighboring the current block and restored values of pixels neighboring the reference block;
an illumination compensation parameter calculation unit, based on the predicted mean value of the pixels of the current block, the predicted mean value of the pixels of the reference block, and the values of the pixels of the current block and the reference block, determining an illumination compensation parameter for illumination compensation of the reference block; and
an illumination compensation unit which performs illumination compensation of the reference block, by using the determined illumination compensation parameter.

8. The apparatus of claim 7, wherein the mean value prediction unit predicts the mean value of the values of the pixels neighboring the current block to be the mean value of the pixels of the current block, and the mean value of the values of the pixels neighboring the reference block to be the mean value of the pixels of the reference block.

9. The apparatus of claim 7, wherein the illumination compensation parameter calculation unit determines an illumination compensation parameter which minimizes a difference between the pixels of an illumination-compensated reference block and the original pixels of the current block, the illumination-compensated reference block being generated by multiplying a difference between the restored pixels of the reference block and the mean value of the pixels neighboring the reference block, by a predetermined illumination compensation parameter, and then, adding the mean value of the pixels neighboring the current block.

10. The apparatus of claim 7, wherein, assuming that an illumination compensation parameter is $a_{x,y}$, a size of each of the current block and the reference block is M×N, the pixel value at a position (i,j in the current block is f(i,j), the predicted value of the pixel value at the position (i,j) in the current block is $f_E(i,j)$, the restored value of the pixel value at a position (i,j) in the reference block is $r'_{x,y}(i,j)$, the illumination compensation unit generates the illumination-compensated reference block by using the following equation:

$$f_E(i,j) = a_{x,y}(r'_{x,y}(i,j) - DC_r) + DC_f$$

where M, N, i and j are positive integers, $0 \leq i \leq M$, $0 \leq j \leq N$, wherein $DC_r$ is a mean value of the pixels neighboring a restored reference block, and wherein $DC_f$ is a mean value of the pixels neighboring a restored current block; and the illumination compensation parameter calculation unit calculates a sum of the differences between each pixel value f(i,j) and the predicted value $f_E(i,j)$ of the current block, and determines an illumination compensation parameter $a_{x,y}$ which minimizes the sum of the differences.

11. The apparatus of claim 7, wherein the illumination compensation parameter calculation unit determines an illumination compensation parameter from a predetermined number of predefined illumination compensation parameters so that a difference between the pixel values of the illumination-compensated reference block and the current block is minimized.

12. The apparatus of claim 7, wherein the illumination compensation parameter calculation unit determines the illumination compensation parameter for illumination compensation of the reference block according to one of two modes comprising a variable mode in which a different illumination compensation parameter is determined for a block of a predetermined size, and a fixed mode in which an identical illumination compensation parameter is determined for sub blocks in the block of the predetermined size.

* * * * *